April 28, 1970     T. M. SEBESTYEN     3,508,395
CONTROL SYSTEM FOR MOTOR VEHICLE TYPE GAS TURBINE ENGINE
Filed April 1, 1968     2 Sheets-Sheet 1
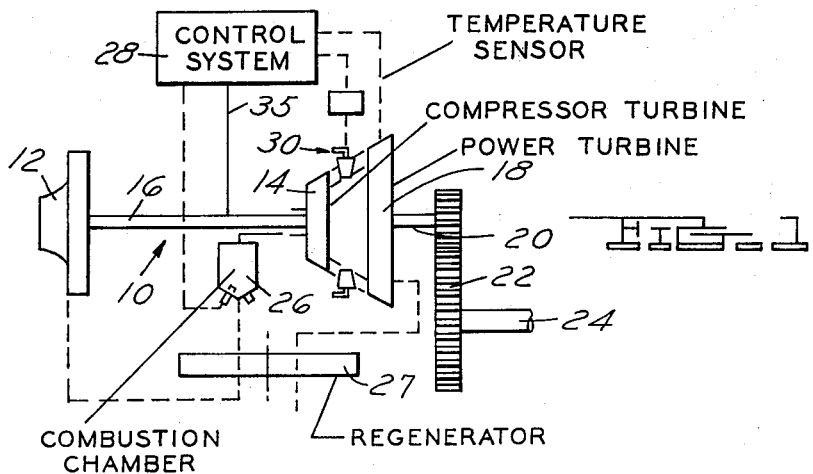
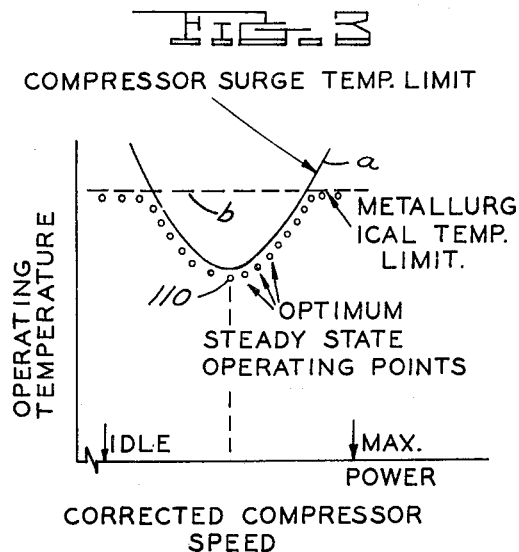
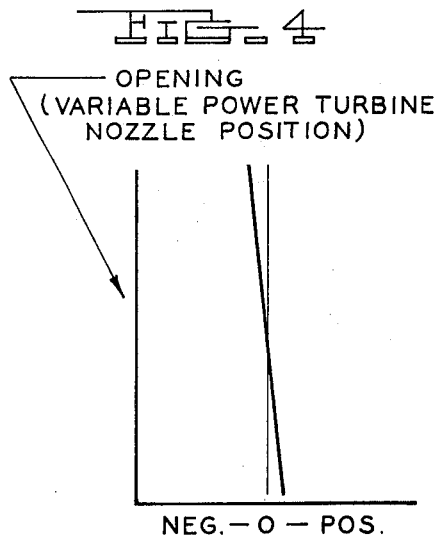
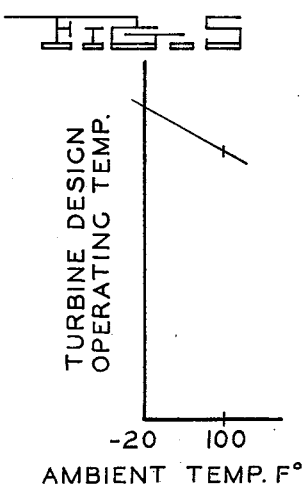
INVENTOR.
THOMAS M. SEBESTYEN
BY
ATTORNEYS

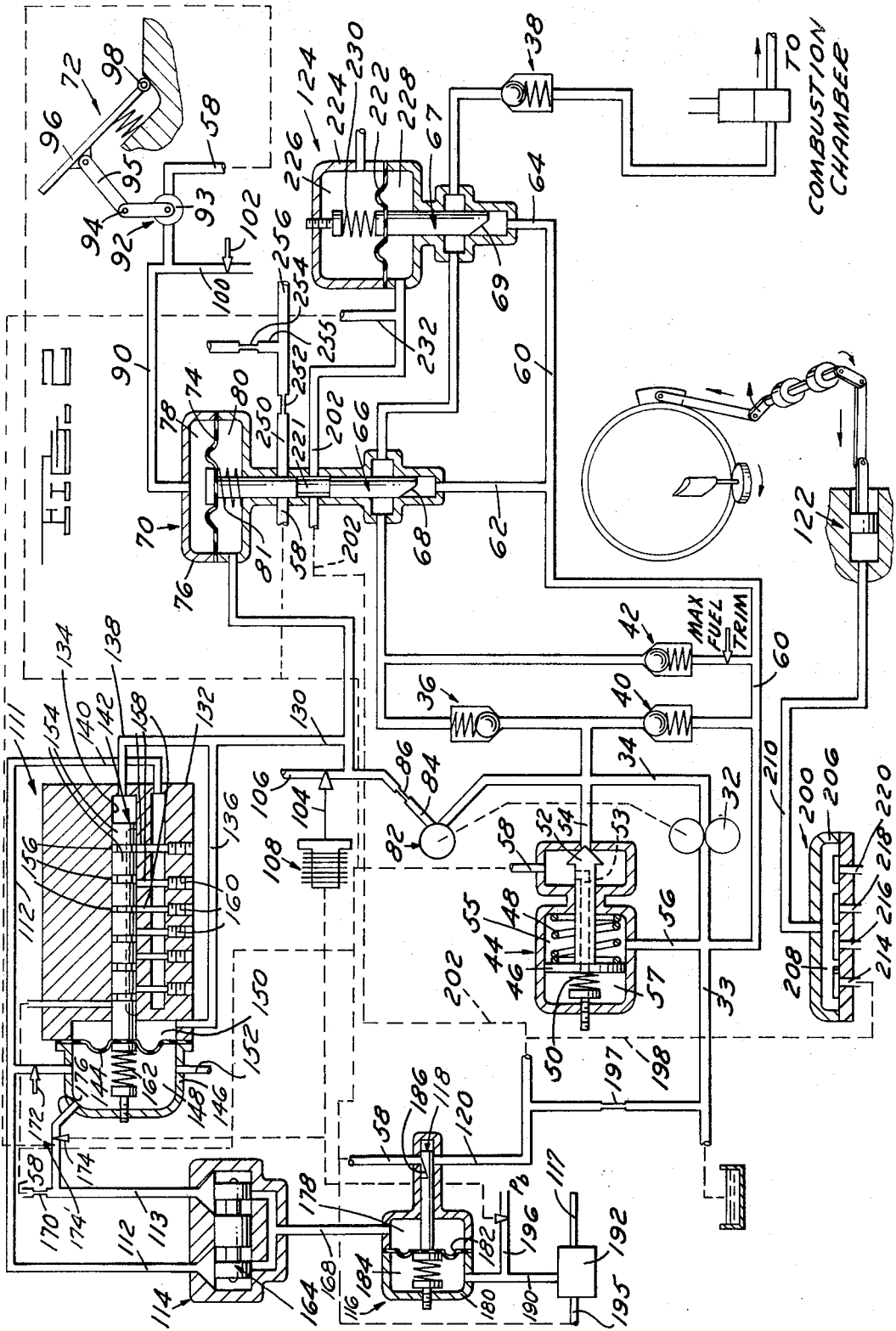

United States Patent Office 3,508,395
Patented Apr. 28, 1970

3,508,395
CONTROL SYSTEM FOR MOTOR VEHICLE TYPE GAS TURBINE ENGINE
Thomas M. Sebestyen, Ann Arbor, Mich., assignor to Ford Motor Company, Dearborn, Mich., a corporation of Delaware
Filed Apr. 1, 1968, Ser. No. 717,536
Int. Cl. F02c 3/10, 9/08, 9/10
U.S. Cl. 60—39.25   10 Claims

ABSTRACT OF THE DISCLOSURE

A control system for an engine having power turbine inlet nozzles that are adjustable, the system including a speed versus throttle setting regulator controlling fuel flow during steady state operation to maintain the speed constant, and an acceleration fuel flow regulator controlled directly by engine operating temperature changes to provide desired acceleration without overtemperaturing the engine or causing the compressor to surge.

---

This invention relates, in general, to a control system for a motor vehicle type gas turbine engine. More particularly, it relates to a control system for a gas turbine engine having an annular series of adjustable power turbine gas inlet nozzles, the system providing direct temperature control during both steady state and accelerating engine operating conditions.

Most known motor vehicle type gas turbine engine control systems rely on indirect means for maintaining desirable engine operating temperatures. In engines of this type, to obtain maximum efficiency and economy of operation, it is desirable that the engine operate at a maximum desirable temperature over most of the speed range, with certain exceptions, such as during idle, for example, this temperature being that which is within the physical limits of the materials used in the engine and avoids compressor surge.

In the past, steady state operating temperatures have been maintained by scheduling the positions of the variable or adjustable power turbine gas inlet nozzles. That is, the nozzles have been moved to positions supposedly providing the desired operating temperature; the registered temperature is noted, and any variance from the level desired is minimized by further adjustments of the nozzles. This, however, requires extreme accuracy of positioning of the nozzles and consistency of engine characteristics, and it is obvious that this approach has given less than satisfactory results.

Similarly, acceleration temperatures have been maintained by scheduling fuel flows based on the most important parameters influencing temperature. However, engine acceleration time has been sacrificed to allow for errors in the measurement of the parameter measured, and to allow for other variations in those parameters not measured when computing the fuel flows.

The invention relates to a motor vehicle type gas turbine engine control system that provides a direct temperature control during both steady state and accelerating operations not only to maintain the desired fuel flow, but also to maintain the engine operating temperature at the maximum desirable value for each speed level of the engine.

More specifically, the invention provides a control system that includes: first, a compressor speed responsive device that regulates fuel flow during steady state operations to maintain compressor speed at the level chosen, the force of the speed responsive device during accelerating conditions being modified as a function of the position of an operator controlled throttle means to adjust the fuel flow and compressor speed to the desired level; secondly, the control system includes temperature control apparatus that during steady state operation senses actual engine operating temperatures and compares it to a design engine operating temperature that is the maximum temperature desired for each speed level of the gasifier section, the differential between the two effecting a change in the positions of the adjustable turbine gas inlet nozzles to correct the operating temperature level until it corresponds to that desired; and, thirdly, the control further includes modifying devices to correct or compensate for changes in engine ambient temperatures, or to prevent overheating of the engine, and include an acceleration fuel flow control device. Other controls will become apparent as the detailed description of the invention proceeds.

It is an object of the invention, therefore, to provide a motor vehicle gas turbine engine control system that provides a direct temperature control of the engine during both steady state and engine acceleration operation conditions.

It is another object of the invention to provide a gas turbine engine control system for an engine having pivotally movable turbine gas inlet nozzles with means to vary the position of the nozzles in direct response to variations in engine operating temperatures from a desired level, and to control the fuel flow to the engine not only as a function of changes in the speed of the engine gasifier section, but also as a direct result of variations in engine operating temperature from the desired level.

Other objects, features, and advantages of the invention will become more apparent on reference to the succeeding detailed description thereof, and to the drawings illustrating the preferred embodiment thereof, wherein:

FIGURE 1 illustrates, schematically, a gas turbine engine of the type in which the invention is embodied;

FIGURE 2 illustrates, schematically, a gas turbine engine control system embodying the invention;

FIGURE 3 graphically shows the changes in steady state desired engine operating temperatures with changes for different levels of rotation of the gasifier section of the turbine engine;

FIGURE 4 illustrates graphically the degree of opening and closing movements of the turbine inlet nozzles with changes in the pressure of the fluid actuating the nozzles, the change in pressure resulting from a differential between actual and desired engine operating temperature at any given engine speed; and FIGURE 5 illustrates graphically the changes in maximum permissible or steady state engine operating temperature level with changes in ambient engine temperatures.

FIGURE 1 illustrates schematically a gas turbine engine of a type commonly installed in a motor vehicle. It has a gasifier section 10 that includes a radial compressor 12 and an axial flow first turbine 14 fixedly interconnected by a shaft 16. A freely rotatable power output turbine 18 is fixedly mounted on a power output shaft 20 that is connected by reduction gearing 22 to a drive line 24. A combustion chamber 26 receives air discharged from compressor 12 through a heat exchanger 27, combines it with fuel supplied thereto from a fuel control illustrated schematically at 28, and upon ignition, discharges the products of combustion through the turbine section past turbines 14 and 18 to drive the same in a known manner. In this case, the power turbine 18 has an annular row of gas inlet nozzles 30 that are pivotally mounted in a known manner for closing down or opening the inlet to the power turbine to control its speed of rotation and also the temperature of the gases passing through the power turbine.

Further details of construction and operation of the engine per se are not given since they are known and believed to be unnecessary for an understanding of the invention. Suffice it to say that the turbine inlet nozzles 30 could be adjustable in a manner similar to that shown in U.S. 3,362,156 to McLean, Turbine Nozzle Actuator, and having a common assignee.

While the engine illustrated in FIGURE 1 shows the compressor and turbine members being of the radial and axial flow type, respectively, it will be clear that they could be, alternately, of the axial flow and radial type, or both axial flow, or both radial flow type, without departing from the scope of the invention.

The invention is directed to the control system 28 that not only controls fuel flow to combustion chamber 26 but controls the fuel flow in direct response to variations in the engine operating temperature from a desired schedule.

More specifically, as seen in FIGURE 2, the control system includes a fuel pump 32 having a fuel inlet line 33 connected to a suitable tank, as shown, and a fuel discharge line 34 operatively connected to combustion chamber 26 in FIGURE 1. The fuel pump, in this case, is shown as being of the gear type; however, it will be clear that it could be of any suitable type without departing from the scope of the invention.

Pump 32 is driven through a suitable connection 35 (FIGURE 1) to the gasifier section of the engine, although it could be driven electrically, if desired. The capacity of the pump is such that more fuel is delivered through the discharge line 34 at all times than is necessary to satisfy the engine operating requirements.

Discharge line 34 has a number of controls to maintain a minimum pressure level therein, including pressurizing valves 36 and 38. Each of the latter valves in this case consists of a ball check valve biased by a preloaded spring to remain closed below a predetermined pressure of the discharged fuel. A number of pressure relief valves 40 and 42 are also provided and set at sufficiently high selected values to permit a bypass of the fuel to the intake line 33 when the fuel pressure exceeds a desired maximum value, in a known manner.

Discharge line 34 also has a branch passage 54 that contains a pressure regulating valve assembly 44. The latter maintains the pressure in a line 58 at some constant intermediate pressure level below that of the fuel discharged from pump 32. Assembly 44 includes a piston 46 differentially biased by a pair of springs 48 and 50 to an initial position locating a needle type regulating valve 52 to open wide branch line 54 connected to pump 32. The forward spring chamber 55 is vented to the reference pressure 33 at the intake of the pump by a line 56. Needle valve 52 controls the pressure drop between line 54 and line 58 so as to maintain line 58 essentially at a constant pressure level for actuating other devices in the control system to be described later.

The valve 52 has a central bore 53 that connects the line 58 at all times to the rear fluid pressure chamber 57. When the pressure in chamber 57 is sufficient to overcome the force of spring 48, valve 52 will move to its regulating position, in a known manner, a drop in pressure line 58 effecting movement of the valve to the left to admit more fluid, etc.

As stated previously, the output capacity of pump 32 is chosen so as to always be greater than the requirements of the engine. Accordingly, discharge line 34 is connected to a fuel bypass passage 60 by a number of intersecting passages 62 and 64, a pair of valves 66 and 67 being movably inserted in the junctions between the lines. Each has a metering contour 68, 69 of a predetermined profile that variably restricts flow between the two lines in a predetermined manner as a function of the movement of the valves.

The movement of valve 66 is controlled by a speed regulator 70 for regulating the steady state fuel flow to maintain the compressor speed constant. Changes in the speed levels are provided by a biasing force exerted on the speed regulator by an operator movable accelerator pedal control indicated in general at 72.

More specifically, valve 66 is fixedly attached to a flexible annular diaphragm 74 that is movably and sealingly mounted within a fluid motor housing 76 to divide it into upper and lower chambers 78 and 80. Diaphragm 74 initially would be biased upwardly by a spring 81 to position valve 66 for a full bypass of fuel from line 34 into line 60, or as much bypass as is desired.

Lower chamber 80 is supplied with a variable pressure fluid from a speed responsive fluid pressure generator illustrated schematically at 82. The latter in its simplest form can consist of a centrifugal fluid pressure regulator driven by a suitable connection to the compressor shaft 16 shown in FIGURE 1 and providing an output pressure in line 84 that varies along a parabolic curve to increase the pressure with increases in compressor speed. Fluid pressure generators of this type are known in the prior art relating to automatic transmissions, for example, employing speed responsive governors to provide a fluid pressure signal that varies as a function of the changes in either engine or vehicle speed. The line 84 contains an orifice 86 that permits the source to develop a constant force, in a known manner, and also, as will be seen later, permits the establishment of a modified pressure upstream of the orifice.

The fluid pressure force opposing upward movement of diaphragm 74 is provided by the operator controlled apparatus 72. More specifically, upper chamber 78 is supplied with fluid under pressure in a line 90 connected to a branch of pressure line 58, the level of the pressure being controlled by a rotary valve assembly 92. This latter assembly, in its simplest form, can consist of a rotary type valve 93 that is spring biased towards one extreme position (engine idle) restricting flow between line 58 and 90 to a minimum, and, in its other extreme position (full power), fully opens communication between the two. A connection (not shown) to valve 93 can also be made, if desired, to pull the valve through a detent past engine idle speed position to completely block flow between lines 58 and 90, and therefore permit spring 81 of regulator 70 to move valve 66 to a full fuel bypass position, for an emergency fuel shut off operation.

The rotary valve 93 has a pivotal connection 94 to an actuator 95 that abuts the underside of a conventional operator throttle lever 96. The lever is pivotally mounted at one end 98 to a portion of the vehicle body, and spring biased to an at rest position. The at rest position, in this case, would correspond to the idle speed setting for the engine. Depression of the pedal progressively downwardly variably moves valve 93 to variably open communication between lines 58 and 90 until a pressure level exists in chamber 78 corresponding to maximum power demand by the vehicle operator.

As thus far described, it will be seen that lower chamber 80 of regulator 70 constitutes a compressor speed responsive means to variably open bypass duct 62 and progressively decrease fuel flow to the engine as compressor speed increases in an attempt to maintain the speed selected by the control 72. Operator control 72, on the other hand, acts as a power demand control to variably close bypass duct 62 and increase the fuel flow to the engine to provide the desired acceleration and power to raise the engine speed to the chosen level.

Both the speed responsive and operator control portions of regulator 70 can be modified to compensate either for various undesirable operations of the engine, or for changes in ambient temperature of the air entering the engine. More specifically, operator control line 90 includes a variable bleed vent or trim line 100 controlled by an adjustable needle valve 102 that controls the pressure level in line 90. The needle valve could be connected to a servo that would be responsive, for example, to vehicle speed above a predetermined level to move the needle valve out of line 100 to increase the drain and reduce the pressure buildup in line 90. This reduces the pressure in chamber 78 of regulator 70 and increases the bypass of fuel from the engine; that is, decreases the fuel supplied to the engine combustion chamber to reduce the speed to or below the maximum level desired. Also, or alternately, as desired, other servo controls of needle valve 102 can be provided that are responsive to overspeed conditions of other portions of the engine.

Similarly, the fluid pressure in speed signal generator line 84 is controlled by a needle valve 104 adjustably mounted to cooperate with a drain line 106. In this case, valve 104 is shown as being operated by a temperature sensor 108 that would be inserted, for example, adjacent the inlet to the compressor of the gas turbine engine shown in FIGURE 1 so as to be sensitive to ambient temperature changes of the air entering the compressor. Since the changes in ambient temperature of the air, with a fixed nozzle, should vary the operating temperatures of the engine, in the manner seen in FIGURE 5, due to increases or decreases in the operating speed of the engine, the change in density and volume, etc. of the air and gases varying the back pressure, etc., it is desirable that the changes in fuel flow, which obviously change the gas temperature and compressor speed, also be modified by changes in ambient temperature. Therefore, the temperature sensitive device 108, in this case, moves needle valve 104 out of drain line 106, when the ambient temperature increases to decrease the maximum pressure level of the fluid in speed responsive line 84 and chamber 80 and, therefore, decrease fuel flow for the same throttle setting.

As thus far described, therefore, the speed of the engine is controlled by controlling the fuel flow as a function of the changes in compressor speed and power demand by the vehicle operator. As stated previously, however, for maximum efficiency and economy of operation, it is desirable to operate the engine at a maximum allowable temperature at all times except under certain circumstances, such as at engine idle, for example. The maximum allowable operating temperature, however, on the one hand, is determined by the physical limits of the materials used in constructing the engine, and on the other hand, must be limited to prevent compressor surge.

As is well known, at each steady state speed level of operation of the compressor, the engine can operate with a temperature only so high, modulated by the turbine inlet nozzles set in progressively more closing positions, before the increased back pressure caused by the increased specific volume, etc., causes the air flow to momentarily reverse in the compressor and thereby cause surge, in a known manner. Accordingly, there is a fixed temperature level for each compressor speed level beyond which the compressor will go into surge. This is more clearly illustrated in FIGURE 3 where the compressor surge line indicates the upper temperature limit for each compressor speed before surge is encountered. The metallurgical limit further indicates the constant temperature limit for the physical properties of the material used in the engine before failure occurs.

Therefore, the engine control system should be designed so that the operating temperature at any particular speed level is always equal to or below the lowest of the two lines A and B. For example, if the compressor is operating at about half speed level, FIGURE 3 indicates that the constant engine operating temperature should only be as high as the level indicated at 110, even though the physical limits temperature has not been reached. On the other hand, if the compressor is operating at idle speed, the constant operating temperature limit is now controlled by the physical limit curve even though the compressor would not go into surge at this point. There are exceptions to this, of course, when a constant speed is not maintained, which will be discussed later.

The above discussion indicates the need for a direct control to prevent overtemperature at any speed during steady state or acceleration operation of the engine that will either cause the compressor to surge or cause a failure of the engine by thermal fatigue of the parts. The invention provides such a control by providing means that indicates the maximum operating temperature desired for each compressor speed level and compares this with the actual operating temperature, any differential between the two delivering a signal to the turbine inlet nozzle actuator to open or close down the same to thereby reduce or increase the operating temperature to the desired level. Thus, the control will provide a direct temperature control of the engine to avoid surge and to avoid destruction of the parts of the engine due to overtemperature.

Referring again to FIGURE 2, the latter temperature control includes, first, a scheduling device 111 that senses changes in compressor speed (line 84) corrected for changes in ambient temperature, and produces an output signal force in a line 112 that is indicative of and corresponds to the maximum temperature that is desired for each particular compressor speed to avoid surge. This would correspond to the curve A in FIGURE 3. Secondly, the temperature control includes an output pressure signal in a line 113 that is indicative of and corresponds to the maximum temperature permitted by the physical properties of the material of the engine indicated by the curve B in FIGURE 3.

The above two output signals are directed to a shuttle valve mechanism 114 that passes the lower pressured of the two fluids to a comparator 116. The latter compares this signal to the actual engine operating temperature signal as provided by a sensor or temperature probe 117, also corrected for ambient temperature changes. The differential between these two axially moves a valve 118 to regulate the fluid pressure in line 120 that is directed, first, to a servo 122 controlling the position of the engine turbine inlet nozzles; and, secondly, to an acceleration flow control fluid motor 124 that actuates the fuel bypass valve 67.

Thus, it will be seen that the temperature control automatically regulates not only the movement of the turbine inlet nozzles to provide the desired engine operating temperature, but also regulates the fuel flow.

More specifically, the speed signal line 84 has a branch 130 directing fluid at varying pressures to the hydraulic cam flow scheduling device 111. The latter includes a valve body 132 having a central bore 134 and a plurality of fluid passages 136, 138 and 140. Passages 136 and 138 are extensions of inlet line 130, and line 140 is a collector discharge line connected to line 112. The central bore 134 slidably and sealingly contains a spool valve 142 that is fixedly secured to a flexible diaphragm 144. The diaphragm is spring biased in one direction, and divides a housing 146 into a low pressure fluid chamber 148 and a high pressure chamber 150. Chamber 148 is connected to boost pressure by a line 152 while chamber 150 connects with line 136.

Valve 142 has a number of spaced lands 154 defining annular flow channels 156 of varying axial width communicating with outlet line 140 through branch passages 158. The opposite portions of the valve communicate with the constant pressure level fuel from the servo supply line 58 past a number of adjustable needle valves 160.

The needle valves are individually adjusted, and the spacing between lands 154 of spool valve 142 controlled to provide an output pressure in lines 140 and 112 that is indicative of or corresponds to the design temperature level for each speed level of the compressor. That is, each of the bleeds 160 would be adjusted individually so that upon movement of valve 142 and diaphragm 144 by a change in the fluid pressure in lines 136 and 138 against the force of spring 162, one or more of the valve annuli would partially or completely align with the needle valve controlled openings to supply a predetermined flow to line 140. The output pressure signal then would correspond to the maximum allowable temperature without surge for the particular speed of rotation of the compressor providing the fuel pressure level in line 130 at that time.

The fuel pressure in line 140 is then supplied to one side of the lowest pressure selector shuttle valve 114. The latter comprises a balanced spool valve 164 controlling the fuel flow through the valve from either line 112 or the fuel signal pressure line 113. Line 113 contains fuel pressure from line 58 controlled by an orifice 170. The orifice maintains a constant pressure level in line 113 that is indicative of the maximum desired engine temperature level insofar as the phyiscal properties limit of the parts of the engine are concerned. This fuel pressure in line 113 is imposed on the right end of shuttle valve 164. As will be obvious, whichever of the fuel pressure signals in lines 112 or 113 is the highest will move the valve towards the other line to admit the lower fuel pressure signal from the output line into line 168. This corresponds to the desired temperature maximum indicated in FIGURE 3, where at any particular compressor speed, the maximum allowable operating temperature will be determined by the lower between the physical properties temperatures limit or the compressor surge limit.

The pressure level schedule in line 112 may be modified, for any desired reasons, by means of an adjustable bleed 172 controlling the bypass of fuel back to the fuel pump inlet through inlet chamber 148. The pressure level in line 113 may also be made sensitive to changes in ambient temperature, in a manner similar to the speed responsive pressure line 136, by an adjustable bleed valve 174 operably connected to the ambient temperature sensitive means 108. Changes in ambient temperature will vary the position of the needle with respect to the branch line 176 to raise or lower the pressure in line 113 by venting or blocking the vent or drain of fuel pressure into chamber 148.

The fluid pressure signal in line 168 is directed to the comparator or error valve 116. The latter consists of a housing 180 divided by a diaphragm 182 into two chambers 178 and 184. The diaphragm 182 is fixed to regulating valve 118 having a cam profiled face 186 that movably controls the flow of servo pressure fluid from line 58 through line 120.

In this case, chamber 184 is connected to fuel pressure in a line 190 from a temperature transducer illustrated schematically at 192. The latter includes a temperature sensitive member or probe 117 that would project into an operating portion of the engine gas stream, such as for example, in the inlet portion of the compressor turbine gas flow circuit. The probe would have a part movable in response to changes in actual engine operating temperature above a predetermined level to move a regulating valve, for example, to control the fluid pressure communication between branch 195 of servo line 58 and line 190, the signal in line 190 being indicative of the actual operating temperature. The signal in line 190 would be corrected for changes in ambient temperature by means of a needle valve adjustably restricting a vent line 196. The valve is operably moved by a connection to the ambient temperature sensor, as shown.

The error value then compares the actual engine operating temperature signal in line 190 to the desired engine signal in line 168, the differential between the two moving the valve 118 to increase or decrease pressure in line 120. Line 120 contains an orifice 197 isolating the line from the inlet to fuel pump 32. Upstream of the orifice, the line 120 is branched with one portion 198 leading to a higher pressure selector valve device 200, and the branch portion 202 leading to the acceleration fuel and nozzle control motor 124.

The highest pressure selector device valve 200 includes a valve body 206 having a chamber 208 connected by a line 210 to the servo 122 for operating the turbine inlet nozzles towards their open or closed positions. The chamber communicates through four ports 214, 216, 218 and 220, either with line 198 or, in this case, three other lines providing other suitable controls. Each of the ports is closed by a one-way reed type check valve that permits the highest pressure fluid to pass into chamber 208 and line 210 while closing the reed valves for the other lines. The use of such a selector valve controls the engine operating temperature to protect the engine since the higher the pressure in line 210, the more open the nozzles will be and the more the operating temperature is lowered by the nozzles per se.

Simultaneously, with flow of fluid under pressure in line 120 to line 198, the flow is provided to line 202. The speed controlled valve 66 contains a reduced diameter neck portion 221, which, when valve 66 is in the accelerating position, will connect line 202 to the acceleration fuel flow and nozzle control device 124.

This latter device 124 includes a diaphragm 222 dividing a housing 224 into an ambient or boost pressure chamber 226, and an error valve signal pressure chamber 228. Valve 67 is fixed to diaphragm 222, which is biased downwardly by a spring 230 to move the valve into a portion of the bypass duct 64 to normally block the bypass line by the maximum amount desired.

When valve 66 is moved downwardly to a position indicating an acceleration operation of the engine rather than steady state operation, the through port 221 in valve 66 directs the differential pressure signal from the error valve 116 to diaphragm 222. This raises valve 67 and thereby controls fuel flow during acceleration to control turbine temperature.

The control line 202 has a branch 232 that is operatively connected to an adjustable needle valve 174' similar to the needle valve controlling the metallurgical temperature limit signal line 113. During acceleration, the engine parts can stand a momentary over-temperaturing beyond the point that can be withstood if a constant temperature level were maintained. Accordingly, during acceleration, the bias on valve 174' by the error valve signal pressure in line 232 will move the valve 174' more into line 176 to restrict the vent of fluid therethrough and raise the pressure level of the fuel in line 113.

Thermodynamically, this is made possible by the fact that opening the nozzles during acceleration while maintaining the same temperature by increasing the fuel flow still results in a net gain in compressor surge margin because now more air flow is permitted for the same temperature level. Metallurgically, the increased temperatures are permissible for the short duration of the acceleration. Actually, the power turbine nozzles are open not only to allow higher temperatures without compressor surge, but also to allow more pressure drop across the compressor turbine resulting in even faster acceleration. The air flow increases, causing an increase in more fuel flow and an increased compressor speed.

The regulator 70 further provides a deceleration control cooperating with the upper land of valve 66 and the reduced annulus or neck diameter 221. That is, when the vehicle operator control throttle lever 96 is released either fully through detent to shut off the connection between lines 58 and 90, or to its idle speed position providing a minimum scheduled pressure in line 90, spring 81 of the speed governor control 70 will move diaphragm 74 upwardly and connect the reduced diameter valve portion 221 with a line 250. This latter line receives fuel pressure from line 58 regulated by an orifice 252 and a further vent control orifice 254 in a branch line 255 leading to the fuel pump inlet line. The signal pressure then acts in a line 256 that can be connected to the port 216 of the highest pressure selector valve 200.

Accordingly, at this time (deceleration operation), when the fuel is essentially all or entirely bypassed, the sudden drop in engine operating temperature normally would cause the error valve 116 to provide a very low pressure in nozzle control line 198, which, if this were the only pressure, would tend to completely close the nozzle in accordance with the curve shown in FIGURE 4. The deceleration fuel lines 250 and 256, however, by being directed to line 216 at this time, "fool" the nozzle control by providing a higher pressure in line 210 and opening the nozzles to continue to maintain a surge-free engine operation.

OPERATION

Assume that the gas turbine engine is inoperative or shut down. At this time, fuel pump 32 and compressor speed responsive pressure generator 82 will be stopped, and all of the fluid pressure in the lines will be at essentially the boost pressure of the system or equal to the inlet pressure of pump 32. Accordingly, spring 81 of the speed regulator 70 will position diaphragm 74 and valve 66 upwardly to open the fuel bypass passage 62 a maximum amount. Spring 230 of the acceleration fuel flow control device 124, however, positions valve 67 downwardly to completely close bypass passage 64. The pressurizing valves 36 and 38 will be closed preventing a drain back of the fuel from the engine combustion chamber. The accelerator pedal 96 will be in its released, idle speed position.

Assume now that the engine is cranked by a suitable starter mechanism, not shown, that begins rotating the compressor and turbine of the gasifier section up to the speed necessary for firing the engine. As the gasifier section rotates, the fuel pump 32 supplies fuel under increasing pressure into outlet line 34. Until this fuel pressure reaches a level above, said 100 p.s.i., pressurizing valve 36 will remain closed. At this time, fuel under pressure will be delivered to the control line pressure regulator 44. As soon as the differential forces of the spring 46 and 48 are overcome, fuel pressure at a constant predetermined level will be introduced into line 58, which then supplies the throttle pedal controlled line 90 and lines 113, 210, 195 and 250.

In the idle speed position of throttle lever 96, the pressure in line 90 is sufficient, acting in chamber 78, to depress diaphragm 74 and valve 66 to shut bypass duct 62. Substantially simultaneously, the pressure build-up in pump discharge line 34 will open pressurizing valves 36 and 38 and deliver fuel to the combustion chamber of the engine. Concurrently, the compressor speed responsive fluid generator 82 will develop a pressure in line 84 that varies with compressor speed and increased along a parabolic curve in a known manner. This latter force, together with the force of spring 81, will oppose the downward movement of diaphragm 74 by the fluid pressure in chamber 78 to position valve 66 in the bypass duct 62 to provide a predetermined schedule of fuel flow to the engine combustion chamber at this time. Accordingly, upon firing of the engine, regulator 70 will close valve 66, and sufficient fuel will be supplied to the combustion chamber as controlled by acceleration control 124 to sustain operation, and the engine will subsequently operate at idle speed condition, with valve 66 subsequently opening and 67 closing.

Considering the speed control alone, if the compressor speed is below the level called for by the idle speed position of the throttle lever 96, the differential downward force provided by the fuel pressure in chamber 78 will increase the fuel flow to the engine in an attempt to speed it up to the compressor speed desired. As it approaches the speed, the valve 66 will move progressively upwardly to decrease the fuel flow rate until an equilibrium position is obtained at which the fuel flow is sufficient to maintain the compressor speed at the chosen level for idle speed operation. Obviously, if the speed rises above or falls below that called for by the position of the throttle lever, the valve 66 will move in one direction or the other to change the fuel flow rate to accordingly change the compressor speed to the steady state level.

At this time, steady state operation is in effect. Accordingly, valve 66 will permit some bypass of fuel, and the land of valve 66 will block line 202 and prevent a movement of the acceleration flow control valve 124 from the position shown blocking bypass duct 64.

Simultaneous with the speed regulation operation, a temperature control is imposed to prevent operation of the engine at undesirable temperature levels. That is, the speed responsive pressure signal in line 130 will act on the hydraulic scheduling cam valve 142 of device 110 to move it to the left and provide a predetermined flow of the servo pressure fuel in line 58 through the adjustable bleeds 160 and valve land annuli 156 into the signal line 140. At the same time, the signal pressure in line 113 will act on valve 164, the differential between the pressures in lines 113 and 112 moving the valve 164 to the left or right, as the case may be, to admit lower pressure signal to line 168 and error valve chamber 178. If, at this time, the engine operating temperature is the same as the desired value, the signal pressure in line 190 acting in chamber 184 of the error valve, plus the spring force, will equal the pressure in chamber 178 with a resultant minimal pressure in line 120. This low fuel pressure in line 120 acting through the highest pressure selector valve 200 either will not move the nozzles if they are in the correct position, or will move them to the position maintaining the temperature level sensed by the probe 117. On the other hand, if the actual operating temperature is either lower or higher than that desired, the lower or higher pressure in line 120 will move the nozzles accordingly to correct the operating temperature.

The above describes the operation during steady state conditions. Consider now accelerating conditions of operation. Assume that accelerator pedal 96 is depressed from idle towards the maximum power position. The sudden opening of valve 93 increases the pressure in line 90 and chamber 78 and biases diaphragm downwardly to block bypass duct 62. This immediately increases the fuel flow to the engine, which increases engine operating temperature and also compressor speed. The increase in compressor speed increases the pressure in line 84 and in chamber 80, and slowly and progressively begins to move diaphragm 74 upwardly against the biasing force in chamber 78, thus slowly decreasing fuel flow to the engine.

As the fuel flows at a high rate to the engine, the temperature immediately increases, which is sensed by the operating temperature probe 117. Concurrently, the increased pressure in line 130 leading to the scheduling cam device 111 moves the latter to vary the pressure in lines 140 and 112 according to the schedule of the bleed devices 160 and the position of valve 142, so that a particular scheduled fuel pressure exists in line 112. This latter signal is then compared by shuttle valve 114 to the physical property temperature limit signal in line 113, and the higher pressure moves the valve 164 to admit the lower fuel pressure to line 168 to act on the right hand side of the error valve diaphragm 182.

If the signal pressure from the temperature probe 194, acting in line 190, is higher than the design or desired temperature signal in chamber 178, error valve 118 will move to the right and provide greater communication between line 58 and line 120 and its branch lines 198 and 202. The pressure in line 120 will then immediately increase, and acting through the highest level selector valve 200, will move the nozzles according to FIGURE 4 to a more open position in an attempt to reduce the gas temperature.

Simultaneously, since the speed regulated valve 66 is in the acceleration position shown, the increased pressure in line 202 will act on diaphragm 222 of the accelerating fuel and nozzle control 124. When the pressure in the line becomes high enough to overcome the force of spring 230, the diaphragm will raise the valve 67 and begin bleeding fuel back through bypass duct 64 to the inlet of pump 32.

Thus, at this time, when the actual operating temperature is higher than that described for the particular compressor speed at that moment, both the turbine inlet nozzles will open and the fuel flow will be decreased to decrease the actual engine operating temperature to the desired level. Conversely, if the actual engine operating temperature happens to be lower than that desired, as indicated by the pressure in line 168, then the error valve 118 will move to the left to reduce the pressure in lines 198 and 202 and cause a corresponding closing of the nozzle and a simultaneous increase in the fuel supply by closing down bypass duct 64, assuming that the pressure in line 202 acting against daiphragm 222 is sufficient at this time to overcome the spring force. Thus, the actual operating temperature will increase up to the level desired.

Also, as discussed previously, both metallurgically and thermodynamically, the temperature signal 168 is permitted to increase momentarily above the set limits during acceleration since this occurs for only a short period of time. Accordingly, the fuel pressure signal in line 202 leading to the acceleration fuel and nozzle control device 124 acts through line 232 on the adjustable needle valve 174 controlling the maximum allowable temperature signal line 113 to momentarily increase the pressure to the line.

The above accelerating action will continue, with the speed regulating device 70 moving valve 66 slowly upwardly until a point is reached where the compressor speed is at the correct level. At this point, land 220 will shut off the fuel flow from line 202 and cause acceleration control device 124 to become inoperative and return to the position shown. Thus the system will return to the steady state operating condition previously described.

It will be clear from the above that for every position of the accelerator pedal, the same operation will occur until the steady state operating condition for the particular position of the pedal is reached, and that during this entire operation the fuel flow and the engine operating temperature will be correct at all times to provide the desired operation without overtemperaturing the engine or causing compressor surge.

It will also be noted from the above that the ambient temperature controls may cause a slight change in the signal pressure to vary the operating temperature to still maintain maximum desirable operating temperatures while avoiding compressor surge.

During deceleration, when the accelerator pedal is released to its idle speed position and the vehicle is coasting, it is edsirable to completely shut off the fuel supply at this time. Accordingly, when the accelerator pedal is relaxed to its idle speed position from a position of part throttle operation, for example, the sudden release of pressure in line 78 will permit the spring 81 and the speed responsive pressure in chamber 80 to move the valve 66 upwardly and completely open bypass duct 62 so that fuel flow to the combustion chamber is cut off. This upward movement of valve 66 simultaneously opens line 250 to send a signal pressure to the highest pressure selector valve 200 through port 216 to automatically open the nozzles and prevent the engine from surging. If it were not for this latter control, the sudden drop in operating temperature due to the decrease of fuel supply would send a large signal to the error valve 118 indicating a need for a closing of the nozzles to restore the temperature to the level desired during steady state. The deceleration fuel pressure signal in a line 126 thus, in effect fools the nozzles by opening them at this time.

It is to be noted also that the same fuel shut off condition will occur when the vehicle exceeds the predetermined vehicle speed, for example. That is, the adustable needle valve 102 acting on the accelerator pedal control line 90 will be moved out of the circuit to bypass the pressure in line 90 when the vehicle speed attains or passes the desired maximum value. It will also be clear that the deceleration control line can also contain other servo pressure regulating pressures based on other parameters to control the operation of the engine at this and other times.

From the foregoing, therefore, it will be seen that the invention provides an engine control system that provides a direct temperature control of steady state and accelerating operations of conditions of the engine to always maintain a maximum allowable operating temperature at compressor speeds other than at or near idle.

While the invention has been illustrated and described in its preferred embodiment, it will be clear to those skilled in the arts to which it pertains that many changes and modifications may be made thereto without departing from the scope of the invention. For example, while both the metallurgical temperature limit represented by the pressure in line 113 and the actual temperature signal in line 190 are shown corrected for ambient temperature changes, it is within the scope of the invention to use uncorrected signal pressures, i.e., absolute values not corrected for changes in ambient temperature; alternatively, one of the signal pressures could be corrected and the other uncorrected, so long as the one corrected is trimmed with an ambient temperature sensitive correction.

I claim:

1. A control system for a gas turbine engine having a rotatable gasifier section, a combustion chamber, a turbine section, and pivotally mounted turbine inlet nozzles, including: a fuel pump driven by a portion of said gasifier section delivering fuel under pressure through conduit means to said combustion chamber, fuel vent means connected to said conduit means, valve means variably movable between positions blocking or unblocking said vent means to control the flow of fuel to said chamber, gasifier section driven speed responsive means connected to and acting on said valve means for moving said valve means towards a fuel venting position with a force that varies as a function of increases in speed of said gasifier section, and operator controlled variable force means exerting a force on said valve means that varies at the will of said operator and biases said valve means in a fuel vent blocking direction to schedule the flow of fuel to said chamber as a function of the differential between said forces, said engine operating temperature varying as a function of the variations in fuel flow and the pivotal position of said nozzles, engine operating temperature sensitive means in said engine, and control means operatively connected to said temperature sensitive means and said speed responsive means and said nozzles for varying the position of said nozzles as a function of either the changes in the speed of said speed responsive means or the changes in said engine operating temperature, or both, said control means including first force generator means connected to said speed responsive means developing a force signal schedule that varies as a predetermined function of the speed of said gasifier section to provide a first force that varies and is indicative of the desired change in engine operating temperature with each change in the speed level of said gasifier section changing the fuel flow, second force generator means operably connected to and movably by said temperature sensitive means to develop a second signal force indicative of the changes in engine operating temperature, and movable comparator means operably connected to said nozzle means for movement thereof, said comparator being acted upon by first and second forces and movable by the differential therebetween to move said nozzle means to control the engine operating tempertaure, said second force generator means including engine ambient temperature responsive means movable upon changes in ambient temperatures and acting on said second signal force generator means to vary the force of said latter means as an inverse function of the changes in engine ambient temperature.

2. A control system as in claim 1, including additional valve means in said conduit means movable between positions blocking or unblocking said vent means, and means operably connecting said comparator and said additional valve means for movement of said additional valve means in response to a predetermined movement of said comparator to further control fuel flow to said chamber.

3. A control system for a gas turbine engine having a combustion section receiving fuel therein, a gasifier section including rotatable compressor and turbine members, a rotatable power turbine, pivotally mounted turbine inlet nozzle means controlling the flow of combustion chamber gases against said power turbine and the engine operating temperature, a fuel pump driven by said gasifier section, and conduit means connecting the fuel from said pump to said chamber, said control including engine speed and temperature sensitive means to control fuel flow to said chamber and to control the pivotal movement of said nozzle means, said conduit means including a low pressure fuel bypass line connected thereto, valve means variably movable in said bypass line between flow blocking and unblocking positions to control the flow of fuel to said chamber, fluid pressure actuated motor means connected to said valve means for moving it, a source of fluid under pressure driven by said compressor providing fluid that varies in pressure as a function of the changes in speed of said compressor, means connecting said fluid to one side of said motor means to act thereon and urge said valve means in one direction, a second source of fluid under pressure, conduit means connecting said second source to said motor means in opposition to the fluid from said first source, movable operator controlled throttle valve means in said latter conduit means variably controlling the pressure of the fluid to said motor means as a function of the position of said latter valve means, said motor means regulating the flow of fuel to said chamber during steady state engine operating conditions as a function of the change in speed of said compressor to maintain a selected speed essentially constant, the change in flow of fuel to said chamber varying the engine operating temperature, and means responsive to changes in compressor speed and engine operating temperature for controlling the position of said nozzle and thereby the operating temperature of said engine, said latter means including a branch line connected to said first source, control fluid pressure regulating valve means in said branch line variably movable by the fluid therein, said latter valve means having a control portion shaped and constructed to cooperate with a fluid line containing fluid under pressure in such a manner as to provide a first fluid pressure signal downstream of said latter valve means that varies with each change in compressor speed and simulates at each speed level a predetermined desired maximum engine operating temperature level signal for that speed level, fluid pressure servo means for moving said nozzles, second motor controlled valve means in said engine controlling the flow of a fluid under pressure to said servo means, means sensitive to engine operating temperature developing a second fluid pressure signal that varies as a function of the changes in said temperature, and means connecting said first and second signals to opposite sides of the motor controlling the second valve means for positioning said nozzle as a function of the differential between the actual and desired engine operating temperature signals.

4. A control system as in claim 3, including means connecting the fluid controlled by said second motor controlled valve means to a third motor controlled valve means movably controlling said fuel bypass fuel line to actuate the same above a predetermined pressure of the fluid, said latter valve means being movable above said pressure to a bypass line opening position to decrease the fuel to said chamber.

5. A control system as in claim 3, including means in said line controlled by said operator controlled throttle valve means responsive to an engine output shaft speed above a predetermined value to progressively bleed the pressure of the fluid in said line to thereby effect a decrease in the fuel supply to said chamber.

6. A control system as in claim 3, including engine ambient temperature sensitive valve means movably associated with one of said fluid lines and responsive to changes in ambient temperature to vary pressure in said one line.

7. A control system as in claim 3, said operator controlled throttle valve means being movable to a position completely blocking flow of fluid to the one side of said first mentioned motor means permitting said speed responsive fluid pressure acting on the opposite side of said motor means to move the valve means connected thereto to a position completely opening said fuel bypass line to shut down delivery of fuel to said chamber.

8. A control system as in claim 7, said first mentioned valve means cooperating with the fluid line controlled by said second motor controlled valve means and having means thereon blocking flow of fluid through said latter line in one position of said first mentioned valve means and unblocking flow upon movement of said first mentioned valve means to a predetermined position.

9. A control system as in claim 7, said first mentioned valve means having means thereon blocking flow of a fluid under pressure in a line to said servo means when said first mentioned valve mean is in one position restricting flow through said fuel bypass line, said means blocking said latter line unblocking said line and permitting a movement of said nozzle servo means by the fluid in the latter line upon movement of said first mentioned valve means to an initial at-rest position opening said fuel bypass line the desired maximum extent.

10. A control system for a gas turbine engine having a combustion chamber, a gasifier section including a rotatable compressor delivering air under pressure to said combustion chamber and a turbine rotatable with said compressor, a fuel pump driven by and at the speed of rotation of said gasifier section, conduit means connecting said fuel to said chamber, freely rotatable power turbine means receiving and rotated by the products of combustion from said combustion chamber, and pivotally mounted power turbine gas inlet nozzle movable between positions controlling the flow of and temperature of the gases through said power turbine, said control comprising, a fuel bypass line connected in parallel to said fuel conduit means, a compressor speed responsive valve means movably mounted with respect to said bypass line to decrease bypass of fuel as a function of the increase in compressor speed from a predetermined level, movable operator controlled biasing means operably connected to said valve means and movable between first and second positions indicative of speed level demand, said operator controlled means biasing said valve means towards a fuel bypass position with a force that varies between a minimum and maximum in proportion to the movement towards the second position, the control of said valve means regulating fuel flow to said chamber to maintain a steady state speed level of said compressor as determined by the position of said operator controlled means, said control further including further means sensitive to the differential between actual engine operating temperature and desired engine operating temperature for controlling the movement of said nozzles to vary said actual operating temperature to equal said desired operating temperature, said further means including a compressor speed responsive source of fluid under pressure that varies with changes in speed of said compressor, fluid flow scheduling means regulating said latter fluid and movable progressively thereby to provide a first output fluid pressure signal that corresponds to and is indicative of the engine operating temperature level desired for each speed level of speed compressor to prevent compressor surge at that level while operating said engine at a maximum desired temperature level, a second source of fluid under pressure, movable temperature sensitive means mounted in a portion of said engine responsive to changes in actual engine operating temperature above a predetermined value, second regulating means connected to said temperature sensitive means controlling the fluid pressure from said second source to provide a second output fluid pressure signal that varies and is indicative of the level of said actual operating temperature, fluid pressure comparator means differentially acted upon by said first and second pressure signals for movement of said comparator, and regulator valve means connected to said comparator and movable thereby to regulate the fluid pressure in a servo supply line to a servo means controlling the position of said nozzles as a function of the movement of said comparator whereby said nozzles are moved to change the engine actual operating temperature to the engine operating temperature desired for the particular speed level of operation of said compressor, said speed responsive valve means including a land and a flow control port cooperating with a branch of the servo supply line to block or unblock said branch line as a function of the position of said speed responsive valve means, fluid pressure actuated acceleration control valve means connected to said branch line beyond said speed responsive valve means and moved by the fluid pressure therein, said acceleration control valve means being movably mounted with respect to a position opening said control port and upon the attainment of a predetermined pressure in said servo supply line, to control the rate of acceleration of said engine.

References Cited

UNITED STATES PATENTS

| | | | |
|---|---|---|---|
| 2,670,599 | 3/1954 | Davies | 60—39.28 |
| 2,956,576 | 10/1960 | McKeggie | 60—39.28 |
| 3,034,583 | 5/1962 | Best | 60—39.28 |
| 3,098,356 | 7/1963 | Joline | 60—39.16 |
| 3,108,435 | 10/1963 | Chandler | 60—39.28 |
| 3,306,037 | 2/1967 | Fortmann | 60—39.28 |
| 3,307,353 | 3/1967 | Stearns | 60—39.28 |
| 3,316,713 | 5/1967 | Urban | 60—39.28 |
| 3,362,156 | 1/1968 | McLean | 60—39.25 |

MARK M. NEWMAN, Primary Examiner

U.S. Cl. X.R.

60—39.28, 39.16